United States Patent [19]
Bac

[11] Patent Number: 5,861,933
[45] Date of Patent: Jan. 19, 1999

[54] SPECTACLE FRAME AND METHOD FOR SECURING ORGANIC LENSES THERETO

[75] Inventor: Robert B. Bac, Paris, France

[73] Assignees: Robert Bac; Colette Bac; Francois Ascoli; Valerie DeBache; David-Oliver Bac, all of Paris, France

[21] Appl. No.: 809,933

[22] PCT Filed: Oct. 16, 1995

[86] PCT No.: PCT/FR95/01359

§ 371 Date: Apr. 3, 1997

§ 102(e) Date: Apr. 3, 1997

[87] PCT Pub. No.: WO96/12983

PCT Pub. Date: May 2, 1996

[30]  Foreign Application Priority Data

Oct. 21, 1994 [FR] France .................................. 94/12585

[51] Int. Cl.⁶ .............................. G02C 1/02; G02C 1/00
[52] U.S. Cl. ............................................. 351/110; 351/41
[58] Field of Search ............................. 351/41, 110, 103, 351/106, 140, 154, 149, 144, 124, 133, 134, 135

[56]  References Cited

U.S. PATENT DOCUMENTS 2,398,137   4/1946   Dunham .

FOREIGN PATENT DOCUMENTS 992 090   10/1951   France .
1064340   5/1954   France .
2624278   6/1989   France .
291548   9/1914   Germany .

*Primary Examiner*—Hung X. Dang
*Attorney, Agent, or Firm*—Young & Thompson

[57]  ABSTRACT

The spectacle frame comprises two side pieces each adapted to be secured to one of two organic lenses by hinging one of its ends, and a bridge adapted to be secured between the two lenses, a part of the side pieces and/or the bridge comprising elements for directly securing them to the lenses. The securing elements are adapted to engage a portion of the cut-out edge of the lenses over a length of approximately 5–10 mm.

9 Claims, 2 Drawing Sheets

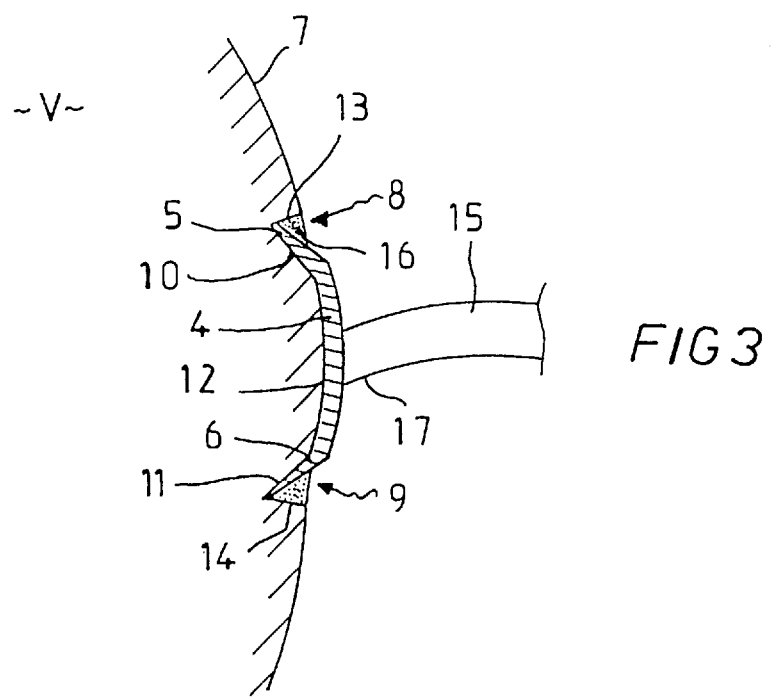

SPECTACLE FRAME AND METHOD FOR SECURING ORGANIC LENSES THERETO

FIELD OF THE INVENTION

The present invention relates to a spectacle frame, as well as a process for assembling a foot with lugs belonging to such a frame to an organic lens.

Specifically, the frame according to the invention belongs to the type in which two side-arms adapted so as each to be fitted to an individual one of two organic lenses via one of its ends forming a hinge and a bridge adapted to be fitted between the two lenses, a part of the side-arms and/or of the bridge including means of direct fixing to the lenses.

BACKGROUND OF THE INVENTION

Document DE-C-291 548 discloses a type of means for directly fixing a bridge to the edge of a mineral lens.

Another category of frames of the aforesaid type, known as "three-piece frames", is available commercially.

These are frames which do not include a part adapted so as to encircle the periphery of the lenses, and which have therefore been designed so as to meet a desire for lightness and discreetness. The bridge and the side-arms of these frames are fixed to the lenses by screwing through the lenses which have therefore to be drilled for this purpose. Screwing requires recourse to a set of screws, washers, nuts and lock-nuts.

Such frames nevertheless have several major drawbacks, resulting in particular in their not being able to be assembled with lenses other than by a highly experienced and highly skilful optician. As a matter of fact, the choice of the angle at which the drilling is to be performed is critical in order that, once assembly has been carried out, the lenses are properly located in the desired wearing plane; once the angle has been chosen, it is difficult to make it comply with the drilling; finally, the optician must take all precautions to prevent the lens from cracking either during the initial drilling, or subsequently, namely during the operation of tightening the screws after fitting, or even in the course of use, under the effect of the stress exerted on the lens. In the event of breakage, the optician has to fashion a new lens and again devote considerable time and effort to the fixing thereof, and this may give rise to very significant costs. As a result, numerous opticians are reticent to propose such frames. Let us add that these frames have, for the optician, the drawback of entailing a relatively complex and costly assembly device, owing to the diversity of the pieces forming the fixing means.

Coming to the wearer, the placement of the fixing means generates a certain occular nuisance, in particular in the nasal area, owing to the fact that the screws are located within his field of vision. In extreme cases, the wearer may even manifest a convergent squint (wearers exhibiting small pupillary distances).

Finally, spectacles which include such frames are tricky to maintain. Apart from their intrinsic fragility, a problem results from the fact that, in such frames, the screws serving to fix the bridge pass through the lens and through a tab appertaining to the bridge and which is thus applied closely against the internal face of the lens. Dirt slips between this tab and the lens, which dirt is inaccessible but visible from the outside face of the lens. Ultrasound cleaning does not generally allow this dirt to be totally eliminated and the only means of removing it completely is to dismantle the bridge, with the risk of breaking the lens which this entails when dismantling and refitting.

SUMMARY OF THE INVENTION

The purpose of the present invention is to remedy these various drawbacks by proposing a spectacle frame of very low weight, which can be fixed to the lenses by simple means, which any optician can implement, which offers the wearer of spectacles a total visual field and which poses no cleaning problem.

These purposes are achieved in the sense that, according to the invention, the means of fixing of a part of the side-arms and/or of the bridge to the lenses consist in a foot provided with two lugs that are spaced from each other by from around 5 to around 10 mm and are engageable with two blind holes provided in said edge of said lenses, wherein said blind holes do not extend from one face of said lenses to the other, the directions into which the lugs extend, from the respective regions of connection of said lugs with said foot, being divergent. The lenses are therefore no longer drilled.

The foot with lugs may optionally be integral with the part of the side-arms and/or of the bridge.

Advantageously, each of the lugs makes an angle of around 45° with respect to the so-called "principal" direction of the foot in the vicinity of the lug. In this way, the lugs are effectively immobilized in the blind holes.

The term "principal direction" is understood to mean the direction of the tangent to the foot, in the case of a curved foot, and the longitudinal axis of the foot, in the case of a straight foot.

The side-arm part can for example be a joining piece which is integral both with one of the two rotary elements of the hinge and with the foot, the joining piece being perpendicular both to the axis of rotation of the hinge and to the foot.

The side-arm part can also be a joining piece which is integral both with one of the two rotary elements of the hinge and with the foot the joining piece making an angle of between around 80° and around 85° with the so-called "principal" direction of the foot in the vicinity of the joining piece. From the point of view of the wearer of the spectacles which incorporate this frame, the foot is then fixed higher or lower on the edge of the lens than in the previous case.

The bridge part can for example be the end of the bridge itself, integrally secured to, and perpendicular to the foot.

The invention also relates to spectacles which incorporate a frame according to the invention.

The invention further relates to a process for assembling a foot with lugs belonging to a frame according to the invention to an organic lens of spectacles, which comprises the steps consisting:

a) in making a pair of V-shaped blind holes in the edge of the lens, so that the unit formed by the edge part of the lens lying between the blind holes and each of the adjacent walls, the so-called "matching walls", of each blind hole has substantially the same geometry as the foot with lugs;

b) in coating the matching walls of the blind holes with a near-instantaneous setting adhesive;

c) in inserting and then in holding each of the against the matching wall of the blind holes, for the time required for setting;

d) in filling in by means of an adhesive the remaining empty space in the blind holes, between the lugs and the other wall of the blind holes.

Preferably, step d) is implemented around two hours after the end of step c). By virtue of this two stage sticking process, the lugs are effectively immobilized in the blind holes, to the matching wall of which they adhere particularly strongly, even when performing, for example, flexural or tensile movements of the side-arm part and/or bridge part at the corresponding foot.

BRIEF DESCRIPTION OF THE DRAWINGS

The invention will be further detailed below, with reference to the appended drawings in which:

FIG. 3 is a schematic sectional view of a portion of bridge of a frame according to the invention, fixed to an edge part of a lens.

DETAILED DESCRIPTION OF THE INVENTION

Figure 1:
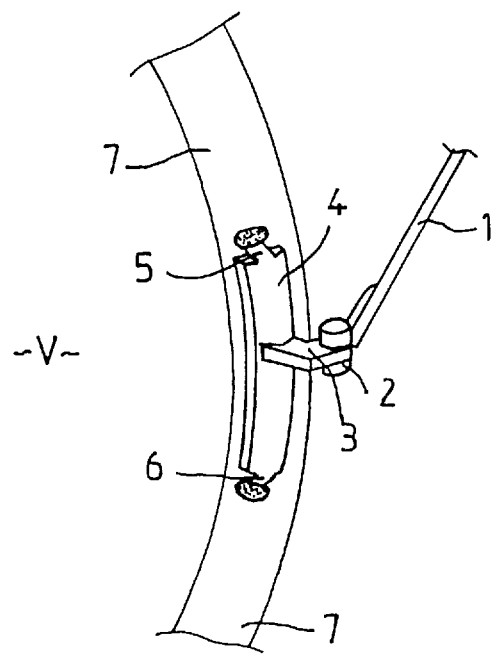
FIG. 1 is a perspective view of a portion of side-arm of a frame according to the invention, fixed to an edge part of a lens.

In these figures, identical reference numerals identify identical or similar elements.

Figure 2:
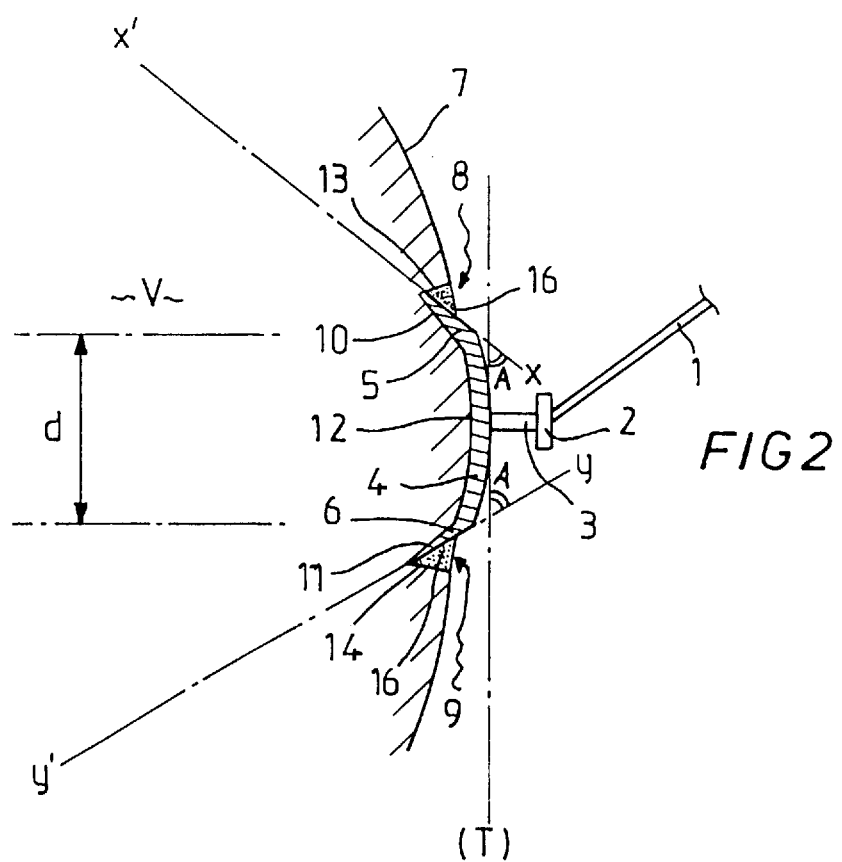
FIG. 2 is a schematic sectional view of the unit represented in FIG. 1.

FIGS. 1 and 2 illustrate a unit consisting of a side-arm portion of spectacles 1 made of steel or titanium, for example, which is partially folded and pivotably mounted on a cylindrical hinge 2, secured to a joining piece 3. The joining piece 3 assumes the form of a square, the two ends of which are in the shape of arcs of circles, one being adapted to the semi-circumference of the hinge 2 and secured to the latter, and the other being secured to a foot 4. The foot 4 offers, opposite the joining piece 3, a substantially rectangular surface which exhibits a small curvature both in the longitudinal and transverse directions, and a small thickness, relative to its other dimensions. The joining piece 3 is located approximately in the transverse midplane of the rectangle. The foot 4 is provided with two lugs 5 and 6 each of which projects from, and has a width less than, a width of the said rectangle. The lugs 5,6 extend in two divergent directions X—X' and Y—Y', respectively, so as to make an angle A of around 45° with the tangent T to the foot 4 at the joining piece 3. The two lugs 5 and 6 have the form of claws which can have a length of 1 to 2 mm and a width of 0.5 mm, for example. The distance d between the lugs 5,6 is between around 5 and around 10 mm; it can for example be 9 mm. The lugs 5 and 6 penetrate respectively into two blind holes 8 and 9 made in the edge 7 of the lens V, part of which is represented.

FIG. 3 illustrates an assembly similar to that of the previous figures, which differs from them only through the fact that a bridge portion 15 has been substituted for the unit consisting of side-arm portion 1, hinge 2 and joining piece 3 of the previous figures; the bridge 15 is integral with, or integrally secured to, the foot 4 via its ends 17. This figure will not therefore be described in greater detail. In this case, the distance separating the two lugs 5 and 6 is for example 8 mm.

The frame unit, as represented in FIGS. 1 and 2, consisting of two side-arms each provided with a foot with lugs and of a bridge, as represented in FIG. 3, provided with a foot with lugs at each of its ends, is made from a lightweight metal and weighs, for example, no more than three grams.

The invention also relates to a four-step process for assembling a foot with lugs according to the invention to a lens edge. This process will be described by reference to FIGS. 1 to 3.

In the first step, a pair of blind holes 8 and 9 is formed in the edge 7 of a lens V, for example by means of a 0.5 mm diameter drill. Each blind hole is delimited, on the one hand, by a wall 10,11 matching with a respective lug 5, 6 and, on the other hand, by another wall 13,14.

The blind holes 8,9 have a geometry such that the unit formed by the edge part of the lens 12 lying between the two blind holes 8 and 9, on the one hand, and the two matching walls 10 and 11, on the other hand, has substantially the same geometry as the foot with lugs 4 provided with lugs 5,6. In the case represented in FIGS. 1 to 3, the foot 4 has a slightly curved shape. It could also have a straight or even dihedral shape, depending on the shape of the lens to which the frame is applied.

The second step consists in coating the matching walls 10,11 with a quick-setting adhesive such as, for example, an adhesive based on epoxy resin, phenolic resin, cyanoacrylate, etc.

In the third step, the two lugs 5 and 6 are introduced into the blind holes 8 and 9, respectively, and pressed against the matching walls 10 and 11, respectively, of the latter, but without deforming the lugs 5,6. The lugs 5,6 are held pressed against the walls 10,11 for the time required for the adhesive to set, which may for example be 30 seconds.

The fourth step, which is for example implemented two hours after the third step, consists in filling in with the aid of the same adhesive or of a different adhesive the empty spaces between the lugs 5 and 6 and the free walls 13 and 14, respectively, of the blind holes 8 and 9, as seen at 16.

As evident from the above description, the invention affords a spectacle frame which, apart from its lightness, is strong and practically invisible, offers a total field of vision and is readily adaptable to concave or convex organic lenses of any shape, especially round, oval, rectangular or pantoscopic and appropriate to any type of correction such as myopia, hypermetropia, astigmatism or presbyopia, as well as to multifocal lenses.

I claim:

1. A spectacle frame comprising two side-arms adapted so as each to be fitted to an individual one of two organic lenses via one of its ends forming a hinge and a bridge adapted to be fitted between said two lenses, a part of side-arms and/or of bridge including means of direct fixing to said lenses, wherein said means of fixing consist in a foot provided with two lugs that are spaced from each other by from around 5 to around 10 mm and are engageable with two blind holes provided in the edge of said lenses, wherein said blind holes do not extend from one face of said lenses to the other, the directions into which said lugs extend, from the respective regions of connection of said lugs with said foot, being divergent.

2. A frame according to claim 1, wherein said foot with lugs is integral with said part of said side-arms and/or of said bridge.

3. A frame according to claim 1, wherein said side-arm part is a joining piece integral both with one of the two rotary elements of said hinge and with said foot, said joining piece being perpendicular both to the axis of rotation of said hinge and to said foot.

4. A frame according to claim 1, wherein said bridge part is the end of the bridge itself, perpendicular to, and secured to, said foot.

5. A frame according to claim 1, wherein said side-arm part is a joining piece integral both with one of two rotary elements of the said hinge and with said foot, said joining piece making an angle of between around 80° and around 85° with a principal direction of said foot in the vicinity of said joining piece, the principal direction being the direction of the tangent to the foot, in the case of a curved foot, and the longitudinal axis of the foot, in the case of a straight foot.

6. A frame according to claim 1, wherein each of the said lugs makes an angle of about 45° with respect to the principal direction of said foot in the vicinity of said lug, the principal direction being the direction of the tangent to the foot, in the case of a curved foot, and the longitudinal axis of the foot, in the case of a straight foot.

7. A process for assembling a foot with lugs belonging to a frame according to claim 1, to an organic lens of spectacles, comprising the steps of:

a) making a pair of V-shaped blind holes in the edge of the lens, so that the unit formed by the edge part of the lens lying between the blind holes and each of the adjacent walls of each blind hole has substantially the same geometry as the foot with lugs;

b) coating the adjacent walls of said blind holes with a near-instantaneous setting adhesive;

c) inserting and then holding each of the lugs against the adjacent wall of the blind holes, for the time required for setting;

d) filling in by means of an adhesive the remaining empty space in the blind holes, between the lugs and the other wall of the blind holes.

8. A process according to claim 7, wherein step d) is implemented around two hours after the end of step c).

9. A spectacle frame comprising two side-arms adapted so as each to be fitted to an individual one of two organic lenses via one of its ends forming a hinge and a bridge adapted to be fitted between the two lenses, a part of the side-arms and/or of the bridge including means of direct fixing to the lenses, wherein said means of fixing consist in a foot provided with two lugs, which are engageable with two blind holes provided in the edge of the lenses, said blind holes not extending from one face of the lenses to the other and said means of fixing being adapted to clasp a part of the edge of the lenses over a length ranging between about 5 to about 10 mm.

* * * * *